United States Patent
Agostini et al.

(10) Patent No.: US 12,306,136 B2
(45) Date of Patent: May 20, 2025

(54) SENSORIZED DEVICE FOR THE ANALYSIS OF A FLUID BY MEANS OF ACOUSTIC WAVES

(71) Applicant: INTA SRL, Pisa (IT)

(72) Inventors: Matteo Agostini, Pisa (IT); Marco Cecchini, Calci (IT)

(73) Assignee: INTA SRL, Pisa (IT)

( * ) Notice: Subject to any disclaimer, the term of this patent is extended or adjusted under 35 U.S.C. 154(b) by 563 days.

(21) Appl. No.: 17/422,131

(22) PCT Filed: Jan. 9, 2020

(86) PCT No.: PCT/IB2020/050151
§ 371 (c)(1),
(2) Date: Jul. 9, 2021

(87) PCT Pub. No.: WO2020/144620
PCT Pub. Date: Jul. 16, 2020

(65) Prior Publication Data
US 2022/0128511 A1    Apr. 28, 2022

(30) Foreign Application Priority Data
Jan. 10, 2019 (IT) .................. 102019000000418

(51) Int. Cl.
*G01N 29/02* (2006.01)
*G01N 29/036* (2006.01)
*G01N 29/22* (2006.01)

(52) U.S. Cl.
CPC ......... *G01N 29/022* (2013.01); *G01N 29/036* (2013.01); *G01N 29/222* (2013.01);
(Continued)

(58) Field of Classification Search
CPC .. G01N 29/022; G01N 29/036; G01N 29/222; G01N 2291/014; G01N 2291/0256; G01N 2291/0423
See application file for complete search history.

(56) References Cited

U.S. PATENT DOCUMENTS 5,571,944 A * 11/1996 Pfeifer ................. G01N 29/022
                                                    73/31.05
6,293,136 B1 * 9/2001 Kim ..................... G01N 29/022
                                                    73/61.79
(Continued)

OTHER PUBLICATIONS

A Rayleigh surface acoustic wave (R-SAW) resonator biosensor based on poistive and negative reflectors with sub-nanomolar limit of detection by Agostini et al., Sensors and Actuators B 254 (2018) 1-7; published online on Jul. 8, 2017.*

*Primary Examiner* — Justin N Olamit
(74) *Attorney, Agent, or Firm* — Maschoff Brennan

(57) ABSTRACT

A method for the detection of analytes within a fluid, said method comprising the steps of prearranging a sensorized device (100) comprising at least one SAW sensor (110), said or each SAW sensor (110) comprising a substrate (115) having an outer surface (115'), at least one emitting interdigital transducer (111) and at least one reflector electrode (112). There are then the steps of adsorbing a plurality of probe molecules, sending n input electric signals, having respective frequencies $f_i$, and subsequent transmission of at least one surface acoustic wave, reflecting by said or each reflector electrode (112) of said or each surface acoustic wave emitted, identifying at least one resonance frequency $f_r$, conveying said fluid on said outer surface (115'), removal of said fluid by said outer surface (115'), verifying a possible change of value of at least one resonance frequency $f_r$ previously identified.

8 Claims, 5 Drawing Sheets

(52) U.S. Cl.
CPC ............... *G01N 2291/014* (2013.01); *G01N 2291/0256* (2013.01); *G01N 2291/0423* (2013.01)

(56) References Cited

U.S. PATENT DOCUMENTS

| | | | |
|---|---|---|---|
| 7,398,685 B2 * | 7/2008 | Itoh | B01F 31/86 73/61.79 |
| 7,500,379 B2 * | 3/2009 | Hines | G01N 29/2481 73/24.01 |
| 7,942,568 B1 * | 5/2011 | Branch | B01F 31/86 366/127 |
| 8,658,097 B2 * | 2/2014 | Okaguchi | G01N 29/022 422/402 |
| 9,726,646 B1 * | 8/2017 | Brocato | G01N 29/30 |
| 10,031,140 B1 * | 7/2018 | Richardson | G01N 29/022 |
| 2004/0101975 A1 | 5/2004 | Gauer | |
| 2006/0049714 A1 * | 3/2006 | Liu | G01S 13/755 310/313 R |
| 2009/0282902 A1 * | 11/2009 | Warthoe | G01N 33/54373 73/64.53 |

* cited by examiner

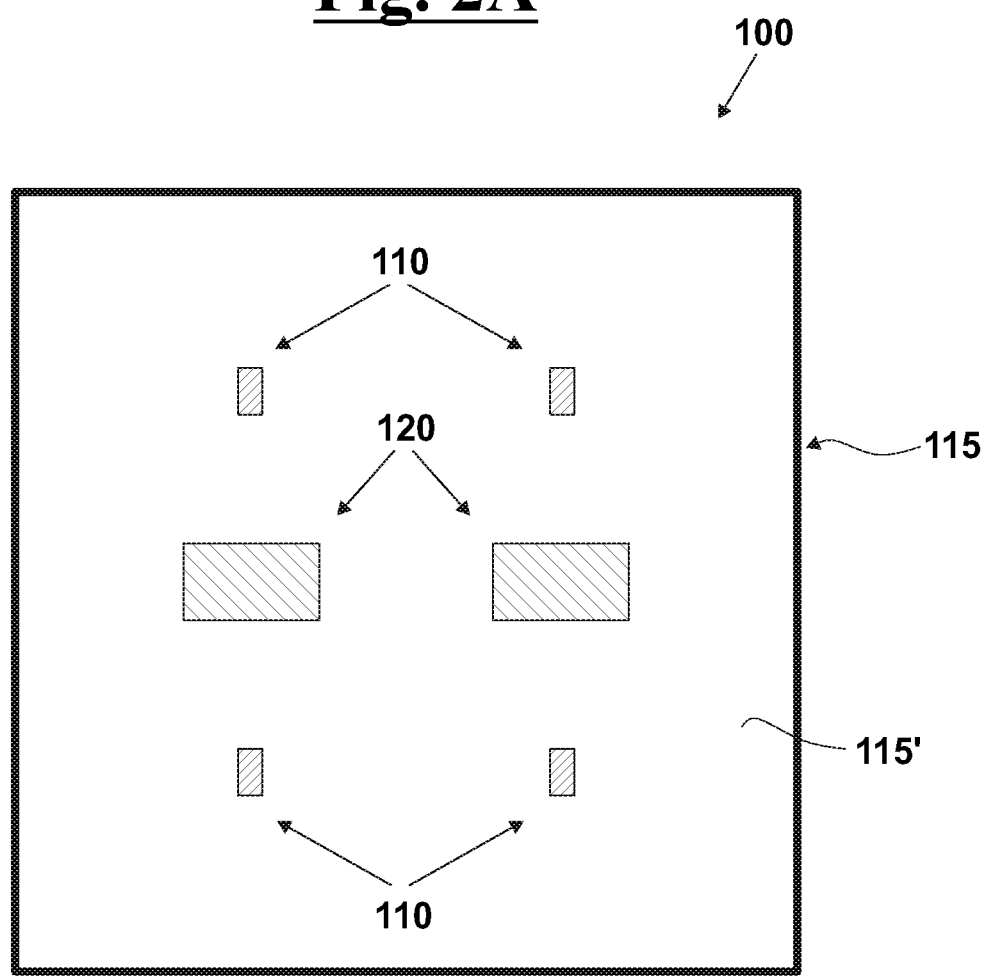

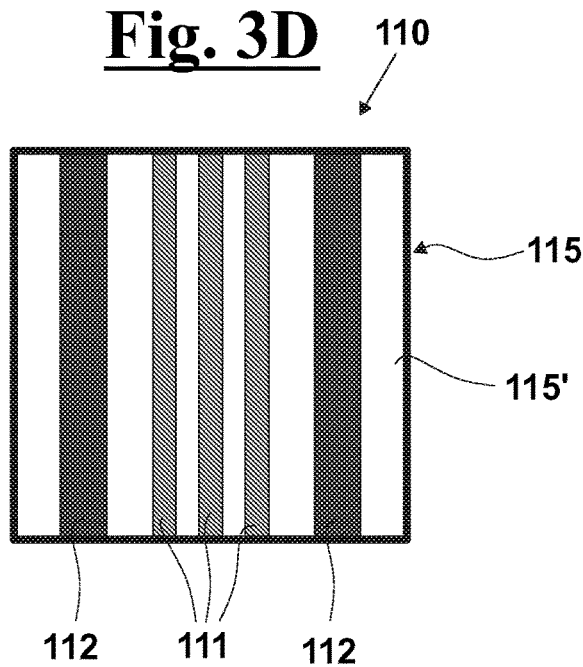
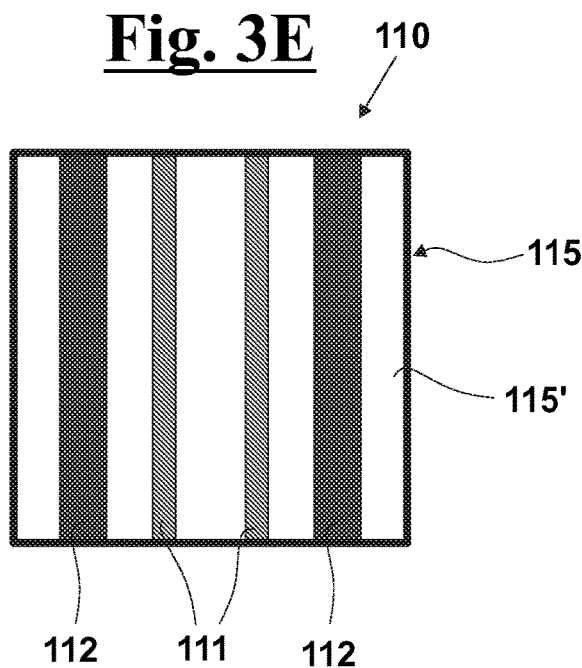
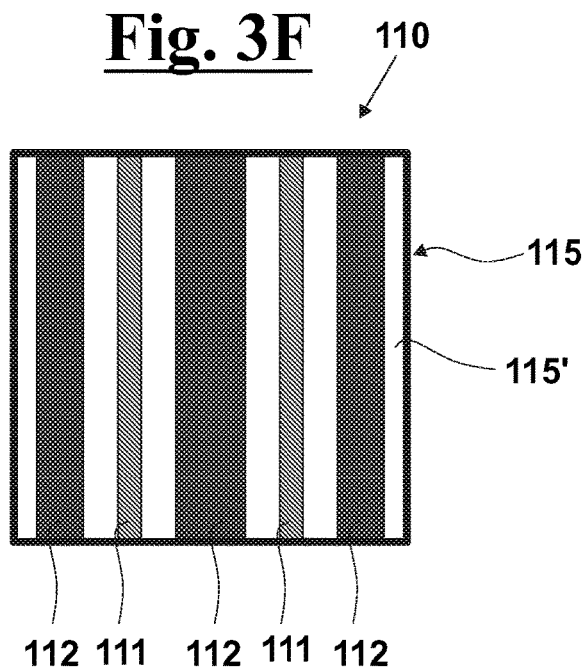

SENSORIZED DEVICE FOR THE ANALYSIS OF A FLUID BY MEANS OF ACOUSTIC WAVES

FIELD OF THE INVENTION

The present invention relates to the analysis of fluids and the detection of specific analytes of interest.

In particular, the invention relates to the detection of these analytes by means of surface acoustic waves generated by nanostructured sensors.

DESCRIPTION OF THE PRIOR ART

Thanks to the rapid technological progress that has taken place in the last decades in the field of micro and nanotechnologies, the so-called "microfluidics", that is the technology that allows the manipulation of biological and non-biological fluids on a micrometric scale, has become of great interest.

In fact, carrying out analysis in a microfluidic regime by means of chips equipped with suitable nanostructured sensors entails considerable advantages compared to standard equipment for laboratory analyses, as it allows the creation of fully automated systems, of limited dimensions and requiring minimal operator intervention, increasing moreover the efficiency of the method thanks to the use of a smaller volume of reagents, while maintaining a high sensitivity. All this translates into significantly reduced costs, a lower complexity of the method itself and an increase in the portability of the analysis tool.

An example of such devices is disclosed in "*A Rayleigh Surface Acoustic Wave (R-SAW) Resonator Biosensor based on Positive and Negative Reflectors with Sub-Nanomolar Detection limit*" of M. Agostini, G. Greco and M. Snipers published in January 2018. The biosensor object of the article includes a piezoelectric substrate on which metal structures are produced capable of generating surface acoustic waves (SAWs), in particular of the Rayleigh type (R-SAWs), by applying radio frequency.

This technology may be of particular interest in the field of timely diagnostics, i.e. the method of analysis carried out on patients whose aim is to identify the presence of pathologies at early stages. In fact, the molecules that see their concentration in the biological fluids of patients change can be indicators ("biomarkers") of damage or dysfunction of internal organs, even before more serious symptoms are observed. For example, the possibility of identifying the onset of cancers such as breast cancer, pancreatic cancer or prostate cancer is known thanks to the monitoring of specific biomarkers. The variation in the concentration of these biomarkers is often detectable only through complex laboratory analyses, especially in the early However, in the field of fluid analysis in order to identify specific analytes, the instruments used mostly make use of optical sensors, which are difficult to integrate on a small chip, while the application of the aforementioned acoustic wave biosensors surface is still a pioneering field of research and in this case there are no examples of effective methodologies.

US2006049714 describes a chemical acoustic wave sensor used to monitor the concentration of an analyte in a substance such as blood. This chemical sensor can comprise one or more interdigital transducers and a selective coating formed on a piezoelectric substrate. The coating and interdigital transducer are used to convert the electrical signal into surface waves. The device comprises an antenna suitable for receiving one or more input signals, which excite the acoustic device and produce an output signal related to the concentration of the analyte of interest.

However, this system does not provide for the possibility of introducing turbulence into the fluid to mix the fluid itself and increase the probability of creating molecular bonds between the analytes and the molecular probes, increasing efficiency in the detection of the analytes themselves. In fact, in US2006049714 only sound waves of the SH-SAWS type are used, which are not adequate to generate the turbulence necessary for the aforementioned purpose.

SUMMARY OF THE INVENTION

It is therefore a feature of the present invention to provide a method for the detection of analytes within a fluid that allows to perform an analysis of accuracy and/or precision equal to or greater than the known methods, making use of nanostructured devices, of overall dimensions considerably lower, with obvious advantages in terms of portability.

It is also a feature of the present invention to provide such a method which allows to reduce costs compared to traditional methods.

It is a further feature of the present invention to provide such a method which allows to facilitate the repeatability of the analyses.

These and other objects are achieved by a method for the detection of analytes within a fluid comprising the steps of:
  prearranging a sensorized device comprising at least one SAW sensor, said or each SAW sensor comprising:
    a substrate having an outer surface comprising at least one piezoelectric portion;
    at least one emitting interdigital transducer arranged on the piezoelectric portion of the outer surface, said emitting interdigital transducer arranged to emit a surface acoustic wave in response to an input electric signal;
    at least one reflector electrode arranged on the outer surface, said reflector electrode arranged to reflect the acoustic wave towards said emitting interdigital transducer;
  adsorbing a plurality of probe molecules on the outer surface of the substrate and/or on said or each emitting interdigital transducer and/or on said or each electrode reflector;
  sending n input electric signals that has respective frequencies $f_i$, with i=1, . . . ,n, to the emitting interdigital transducer and subsequent transducer of at least one surface acoustic wave;
  reflecting by said or each reflector electrode said or each surface acoustic wave emitted;
  identifying, between the n frequencies $f_i$ of the input electric signals, of at least one resonance frequency $f_r$, corresponding to the generation of a surface acoustic wave having power exceeding a predetermined threshold $P_T$;
  conveying the fluid on the outer surface and/or on said or each emitting interdigital transducer and/or on said or each electrode reflector;
  removing the fluid by the outer surface and/or by said or each emitting interdigital transducer and/or by said or each electrode reflector;
  verifying a possible change of value of at least one resonance frequency $f_r$, previously identified.

In particular, it is possible to choose the identified resonance frequency, or one of those identified, and evaluate whether, after the passage of the fluid, an electrical signal at that frequency still produces an acoustic wave having power equal to that previously detected.

Alternatively, it is possible to emit a new plurality of electrical signals and detect a new frequency (or a plurality of new frequencies) of resonance and compare these detected frequencies with those identified before the passage of the fluid.

In both cases, if parameters that influence the position of the resonance frequencies in an undesired manner (such as temperature and pressure) have not changed, and if the reference resonance frequency has not changed, it means that it has not changed the mass density of the external surface of the substrate or of the electrodes of the transducers and reflectors, and therefore it means that the analysed analytes, i.e. the molecules capable of creating a bond with the molecular probes adsorbed on the sensor, were not present in the analysed fluid.

Conversely, the variation of the resonance frequency is a function of the variation of the mass density of the external surface and, therefore, the concentration of the analytes present in the analysed fluid.

The variation in mass density can be positive, in the event that the analytes bind to the molecular probe, or negative, in the event that the analytes cut the molecular probe.

Compared to devices that make use of an optical sensor coupled to a transducer, this solution allows, being completely electric and integrated on a chip, to have a considerably smaller footprint and greater practicality of use, making the device a fluid analysis laboratory easily transportable.

Advantageously, said step of adsorbing a plurality of probe molecules is carried out on said or each emitting interdigital transducer and/or on said or each electrode reflector.

In particular, the sensorized device also comprises an auxiliary interdigital transducer and, simultaneously or upstream of the step of conveying the fluid on the outer surface, a step is provided of transmission, by the auxiliary interdigital transducer, of a surface acoustic wave having frequency $f_t$ for introducing turbulence in the fluid.

In this way, the probability of creating molecular bonds between the analytes and the molecular probes is increased, increasing the efficiency in the detection of the analytes themselves.

Advantageously, the frequencies $f_i$ of the n surface acoustic waves emitted by the emitting interdigital transducer are greater than 800 MHz, whereas the frequency $f_t$ emitted by the auxiliary interdigital transducer is less than 800 MHz.

Advantageously, the sensorized device comprises at least two SAW sensors and a control unit and a step is also provided of comparing the surface acoustic waves reflected by the reflector electrodes of the at least two SAW sensors for reducing noise and determine with higher precision said or each resonance frequency $f_r$.

Compared to devices that use a single SAW sensor, this solution allows to increase the accuracy of the analysis thanks to the differential measurement that acts as a filter on the response signal.

In particular, the sensorized device comprises at least one microfluidic channel arranged to convey the fluid along a predetermined path on the outer surface, in order to contain the fluid in a minimum volume where it is carried out the analysis.

This solution allows a reduced volume of fluid to be used compared to prior art devices, reducing consumption, as well as increasing the surface/volume ratio with a consequent increase in diagnostic performance, and therefore the possibility of significantly increasing the number of analyses performed on the same device.

Advantageously, there is a step of defining at least two resonance frequencies $f_r$.

This solution allows to receive more than one signal simultaneously, being able to make a comparison that reduces the noise of the signal itself.

According to another aspect of the invention, a sensorized device for the detection of analytes within a fluid is claimed, said sensorized device comprising at least one SAW sensor, said or each SAW sensor comprising:
- a substrate having an outer surface comprising at least one piezoelectric portion;
- an emitting interdigital transducer arranged on the outer surface, said emitting interdigital transducer arranged to emit a surface acoustic wave in response to an input electric signal;
- at least one reflector electrode arranged on the outer surface, said reflector electrode arranged to reflect the acoustic wave towards the emitting interdigital transducer.

The present invention therefore presents a device that can be fully integrated within a chip, capable of performing highly sensitive analyses with respect to traditional instruments, so as to allow the implementation of the aforementioned method.

Advantageously, an auxiliary interdigital transducer is also provided arranged to emit a surface acoustic wave having frequency $f_t$ for introducing turbulence in the fluid, and where the frequencies $f_i$ of the n surface acoustic waves emitted by the emitting interdigital transducer are greater than 800 MHz, whereas the frequency $f_t$ emitted by the auxiliary interdigital transducer is less than 800 MHz.

In particular, at least two SAW sensors and a control unit are also provided arranged to compare the surface acoustic waves reflected by the reflector electrodes of the at least two SAW sensors for reducing noise.

In particular, at least one microfluidic channel is also provided arranged to convey the fluid along a predetermined path on the outer surface, in order to contain the fluid in a minimum volume where it is carried out said analysis.

In particular, said or each SAW sensor is a R-SAW sensor adapted to generate surface acoustic waves of Rayleigh type [Rayleigh Surface Acoustic Wave].

Advantageously, the piezoelectric portion of the substrate is made of Lithium niobate [LN].

This material allows the transmission of the R-SAW surface acoustic waves at least in a direction.

In particular, the substrate has cut "Y-cut 128° X-rotated".

This way, the substrate allows the transmission of the R-SAW surface acoustic waves at least in two directions.

BRIEF DESCRIPTION OF THE DRAWINGS

Further characteristic and/or advantages of the present invention are more bright with the following description of an exemplary embodiment thereof, exemplifying but not limitative, with reference to the attached drawings in which:

FIG. 2A shows a possible exemplary embodiment of the sensorized device for the detection of analytes within a fluid, according to the present invention;

FIGS. 3A, 3B, 3C, 3D, 3E and 3F show some possible dispositions of the interdigital transducers and of the reflector electrodes on the outer surface of the substrate.

DESCRIPTION OF A PREFERRED EXEMPLARY EMBODIMENT

Figure 1:
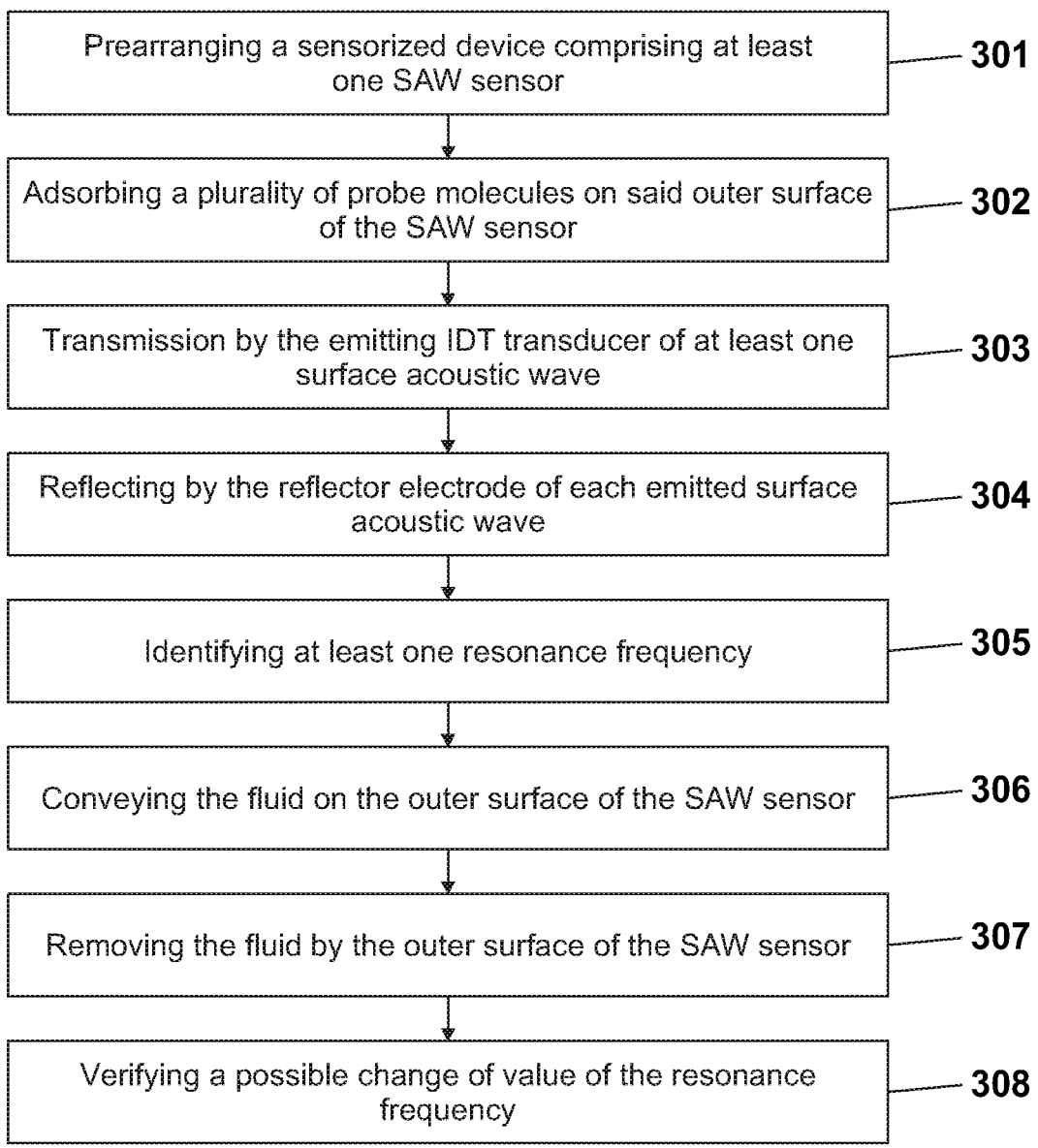
FIG. 1 shows the flow-sheet of a method for the detection of analytes within a fluid, according to the present invention.

With reference to the flow-sheet 300 of FIG. 1, the method for the detection of analytes within a fluid, according to the present invention, comprises a first step of prearranging a sensorized device 100, of which one possible exemplary embodiment is shown in FIG. 2A.

In particular, the sensorized device 100 of FIG. 2A comprises 4 SAW sensors 110, each of which comprising in turn a substrate 115 having an outer surface 115' with at least one piezoelectric portion. With reference even at FIGS. 3A, 3B, 3C, 3D, 3E and 3F each SAW sensor 110 comprises at least one emitting interdigital transducer 111 and at least one reflector electrode 112 arranged on the piezoelectric portion of the outer surface 115'. In particular, the emitting interdigital transducer 111 is adapted to emit a surface acoustic wave in response to an input electric signal, whereas the reflector electrode 112 is adapted to reflect the acoustic wave towards the emitting interdigital transducer 111.

Furthermore, the sensorized device 100 can comprise at least one auxiliary interdigital transducer 120 arranged to emit a surface acoustic wave having frequency $f_t$ for introducing turbulence in the fluid.

Sill with reference to the flow-sheet 300 of FIG. 1, the method provides then a step of adsorbing a plurality of probe molecules on the outer surface 115' of the substrate 115 and/or on the electrodes of the emitting interdigital transducer 111 and of the reflector electrode 112 [302].

Then there is a step of sending n input electric signals, having respective frequencies $f_i$, with i=1, . . . ,n, to the emitting interdigital transducer 111 and subsequent transmission of at least one surface acoustic wave [303].

There is then a step of reflecting by said or each reflector electrode 112 of said or each surface acoustic wave emitted [304].

On the basis of the reflected signal and/or transmitted, it is possible to identify, between the n frequencies $f_i$ of the input electric signals, at least one resonance frequency $f_r$, corresponding to the generation of a surface acoustic wave having power exceeding a predetermined threshold $P_T$ [305]. Such identifying can be carried out graphically, identifying, in the spectrum of the reflected signal, the peaks higher than a certain value, i.e. at which the acoustic wave has been actually generated and therefore at which the energy of the reflected signal is low or zero.

There is then a step of conveying the fluid at the probe molecules, i.e. on the outer surface 115' of the substrate 115 and/or on the electrodes of the emitting interdigital transducer 111 and of the reflector electrode 112 [306].

Figure 2B:
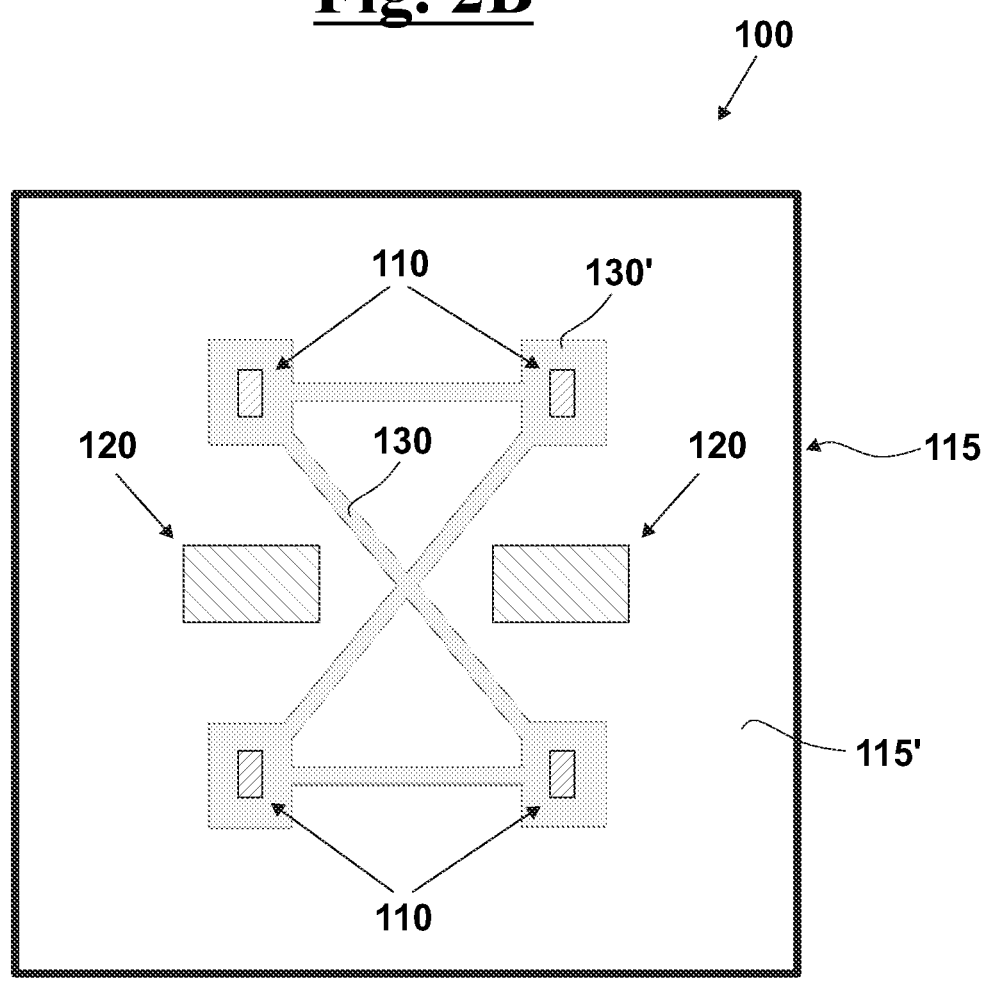
FIG. 2B shows another possible exemplary embodiment of the sensorized device.
Figure 3A:
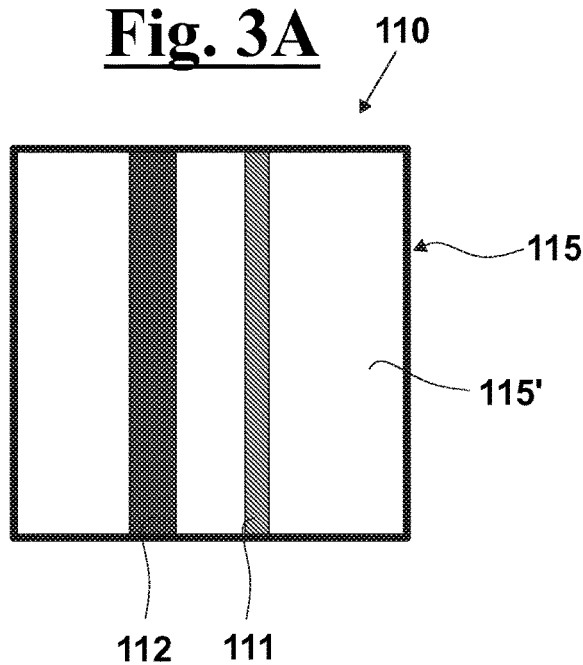
Figure 3B:
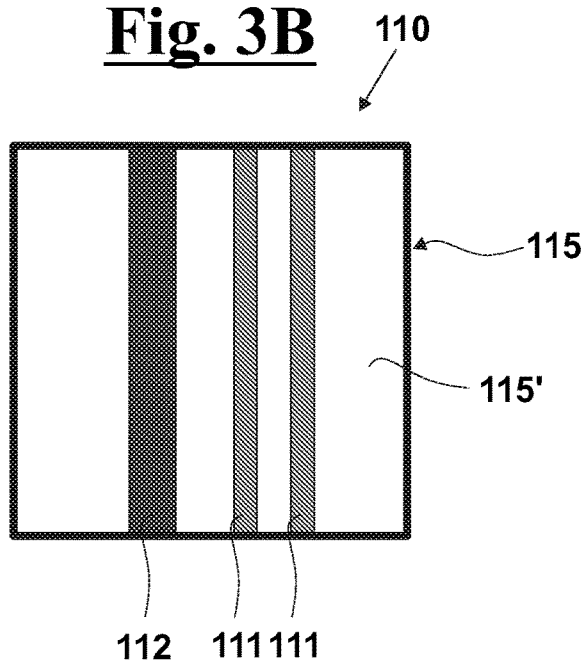
Figure 3C:
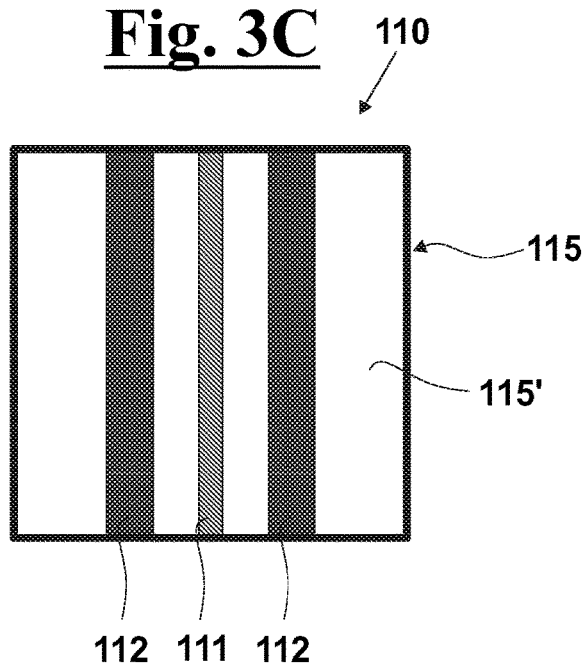

With reference to FIG. 2B, in a preferred exemplary embodiment, the device 100 comprises at least one microfluidic channel 130 arranged to provide the step of conveying by channelling the fluid along a predetermined path on the outer surface 115', in order to contain the fluid in a minimum volume where the analysis is carried out. The microfluidic channel 130 may also comprise an analysis chamber 130' at each SAW sensor 110 for allowing the stationing and/or the movement of the fluid on the electrodes of such SAW sensors 110.

In a preferred exemplary embodiment, the device 100 comprises at least one auxiliary interdigital transducer 120 arranged to emit a surface acoustic wave having frequency $f_t$ for introducing turbulence in the fluid.

Then there is a step of removing the fluid by the area wherein it was conveyed [307].

there is then a step of verifying a possible change of value of at least one resonance frequency $f_r$, previously identified [308].

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. it is to be understood that the phraseology or terminology that is employed herein is for the purpose of description and not of limitation.

The invention claimed is:

1. A method for the detection of analytes within a fluid, said method comprising the steps of:
   prearranging a sensorized device (100) comprising at least two SAW sensors (110), each of said at least two SAW sensors (110) comprising:
   a substrate (115) having an outer surface (115') comprising at least one piezoelectric portion;
   at least one emitting interdigital transducer (111) arranged on said piezoelectric portion of said outer surface (115'), said emitting interdigital transducer (111) arranged to emit a surface acoustic wave in response to an input electric signal;
   at least one reflector electrode (112) arranged on said outer surface (115'), said reflector electrode (112) arranged to reflect said acoustic wave towards said emitting interdigital transducer (111); and
   an auxiliary interdigital transducer (120);
   adsorbing a plurality of probe molecules on each of said at least one emitting interdigital transducer (111) and/or on each of said at least one reflector electrode (112);
   sending n input electric signals, having respective frequencies $f_i$, with i=1, . . . , n, to said at least one emitting interdigital transducer (111) and subsequent transmission by each of said at least one emitting interdigital transducer (111) of at least one surface acoustic wave;
   reflecting by each of said at least one reflector electrode (112) each of said at least one emitted surface acoustic wave;
   identifying, between said n frequencies $f_i$ of said input electric signals, at least one resonance frequency $f_r$, corresponding to the generation of a surface acoustic wave having power exceeding a predetermined threshold $P_T$;
   conveying said fluid on said outer surface (115') and/or on each of said at least one emitting interdigital transducer (111) and/or on each of said at least one reflector electrode (112);
   transmission, by said auxiliary interdigital transducer (120), of a surface acoustic wave having frequency ft for introducing turbulence in said fluid;
   removing said fluid by said outer surface (115') and/or by each of said at least one emitting interdigital transducer (111) and/or by each of said at least one reflector electrode (112); and verifying a possible change of value of at least one resonance frequency fr previously identified;

wherein each of said at least two SAW sensors (110) is a R-SAW sensor adapted to generate Rayleigh surface acoustic waves, wherein said sensorized device (100) comprises a control unit configured to reduce noise based on a comparison of the surface acoustic waves reflected by each of said at least one reflector electrode (112) of said at least two SAW sensors (110), said surface acoustic waves reflected by each of said at least one reflector electrode (112) having the same wavelength.

2. The method for the detection of analytes within a fluid, according to claim 1, wherein said frequencies $f_i$ of said n surface acoustic waves emitted by said at least one emitting interdigital transducer (111) are greater than 800 MHZ, whereas said frequency $f_t$ emitted by said auxiliary interdigital transducer (120) is less than 800 MHz.

3. The method for the detection of analytes within a fluid, according to claim 1, wherein said sensorized device (100) comprises at least one microfluidic channel (130) arranged to convey said fluid along a predetermined path on said outer surface (115'), in order to contain said fluid in a minimum volume where said detection of analytes is carried out.

4. The method for the detection of analytes within a fluid, according to claim 1, wherein said piezoelectric portion of said substrate (115) is made of Lithium niobate.

5. The method for the detection of analytes within a fluid, according to claim 1, wherein there is a step of defining at least two resonance frequencies $f_r$.

6. A sensorized device (100) for the detection of analytes within a fluid, said sensorized device (100) comprising at least two SAW sensors (110), each of said at least two SAW sensors (110) comprising:

a substrate (115) having an outer surface (115') comprising at least one piezoelectric portion;

an emitting interdigital transducer (111) arranged on said outer surface (115'), said emitting interdigital transducer (111) arranged to emit a surface acoustic wave in response to an input electric signal;

at least one reflector electrode (112) arranged on said outer surface (115'), said reflector electrode (112) arranged to reflect said acoustic wave towards said emitting interdigital transducer (111); and an auxiliary interdigital transducer (120) arranged to emit a surface acoustic wave having frequency ft for introducing turbulence in said fluid;

wherein each of said at least one SAW sensor (110) is a R-SAW sensor adapted to generate Rayleigh surface acoustic waves, wherein each of said at least one SAW sensor is configured to adsorb a plurality of probe molecules on said emitting interdigital transducer (111) and/or on said at least one reflector electrode (112);

wherein the sensorized device further comprises a control unit, said control unit is configured to reduce noise by comparing the surface acoustic waves reflected by each of said at least one reflector electrode (112) of each of said at least two SAW sensors (110), said surface acoustic waves reflected by each of said at least one reflector electrode (112) having the same wavelength.

7. The sensorized device (100), according to claim 6, wherein said frequencies $f_i$ of said n surface acoustic waves emitted by said emitting interdigital transducer (111) are greater than 800 MHz, whereas said frequency $f_t$ emitted by said auxiliary interdigital transducer (120) is less than 800 MHz.

8. The sensorized device (100), according to claim 6, wherein at least one microfluidic channel (130) is also provided arranged to convey said fluid along a predetermined path on said outer surface (115'), in order to contain said fluid in a minimum volume where said analysis is carried out.

* * * * *